M. W. LONGFELLOW & H. W. HUNTER.
BROILER.
APPLICATION FILED DEC. 30, 1911.
1,045,049.
Patented Nov. 19, 1912.
2 SHEETS—SHEET 1.
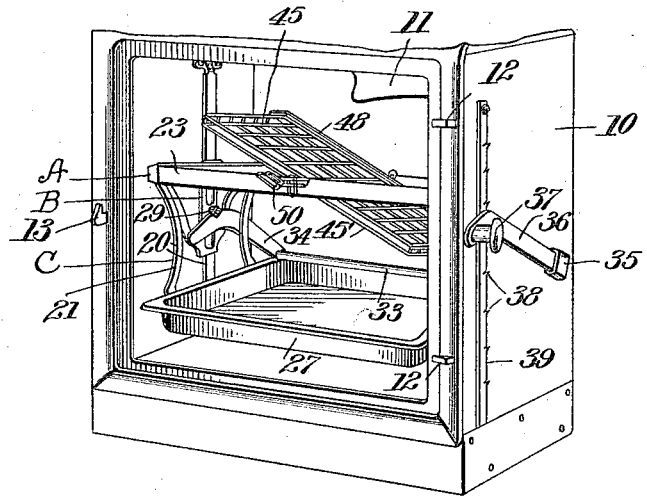
Fig. 1.
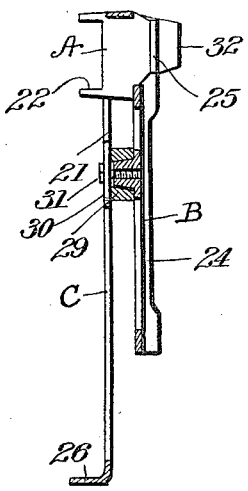
Fig. 2.
Fig. 4.
WITNESSES
INVENTOR
Martin W. Longfellow
Harry W. Hunter
By Hodges & Hodges Attorneys M. W. LONGFELLOW & H. W. HUNTER.
BROILER.
APPLICATION FILED DEC. 30, 1911.
1,045,049.
Patented Nov. 19, 1912.
2 SHEETS—SHEET 2.
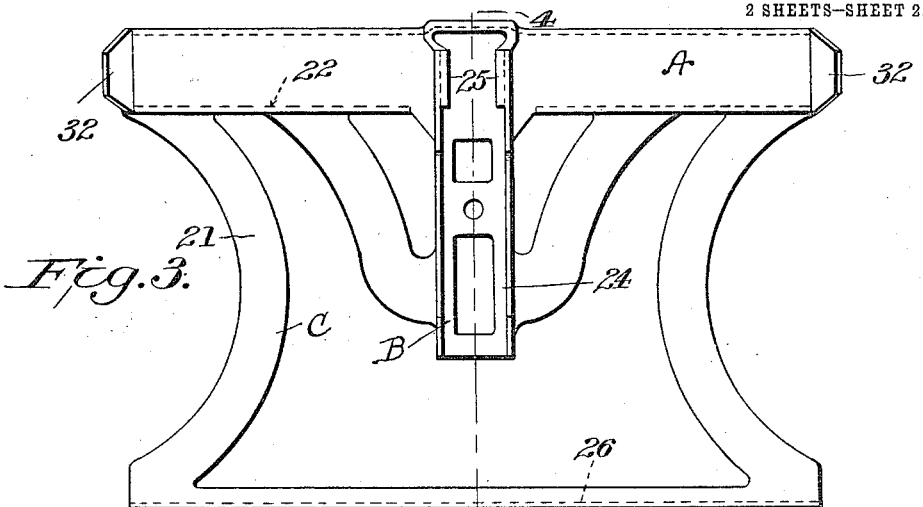
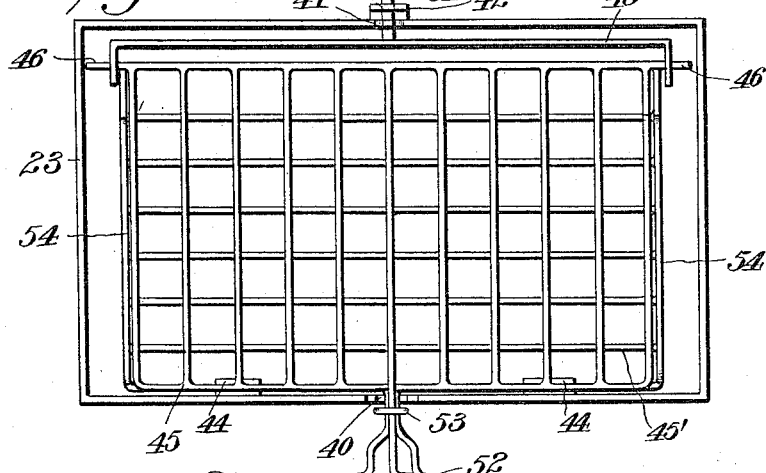
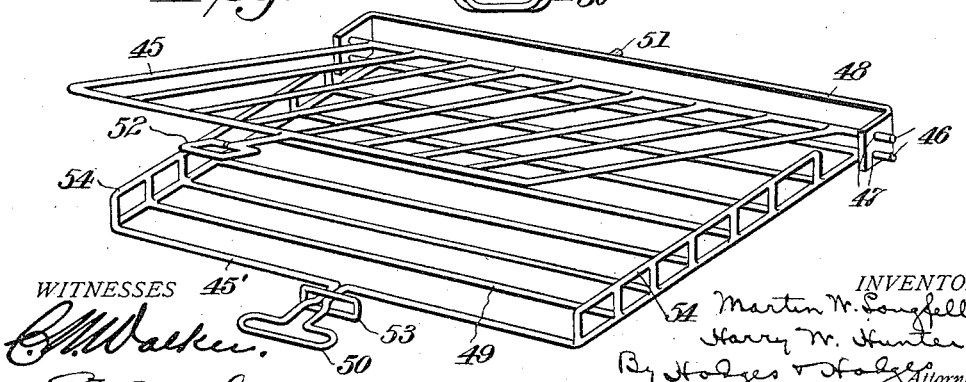
WITNESSES
C. M. Walker.
E. F. Cassel.
INVENTORS
Martin W. Longfellow
Harry W. Hunter
By Hodges & Hodges
Attorneys

UNITED STATES PATENT OFFICE.

MARTIN W. LONGFELLOW AND HARRY W. HUNTER, OF BALTIMORE, MARYLAND, ASSIGNORS TO THE BALTIMORE GAS APPLIANCE AND MANUFACTURING COMPANY, OF BALTIMORE, MARYLAND.

BROILER.

1,045,049.     Specification of Letters Patent.     Patented Nov. 19, 1912.

Application filed December 30, 1911. Serial No. 668,724.

*To all whom it may concern:*

Be it known that we, MARTIN W. LONGFELLOW and HARRY W. HUNTER, citizens of the United States, residing in the city of Baltimore and State of Maryland, have invented new and useful Improvements in Broilers, of which the following is a specification.

This invention pertains to certain new and useful improvements in broilers, and relates more particularly to that class of broilers employed in connection with stoves in which gaseous or liquid fuel is utilized as a heating medium.

The ordinary type of broiler now in general use in gas ranges is very unsatisfactory as a whole, because, in order that the meat may be turned to broil on both sides, the broiling pan must be removed from the broiling chamber and the meat then turned over and returned to the proper position in said broiling chamber. Furthermore, in course of broiling it is necessary from time to time to lower and raise the broiler so that the meat will come in close contact with the fire or at a distance from the latter as occasion may require. Then again the construction of the usual type of broiler is such that the broiling pan and the broiling grid are close together so that the heat from the flame frequently sets fire to the grease that may be in the broiling pan and causes no end of inconvenience to the operator.

The present invention has among its objects, to overcome the foregoing difficulties by providing an improved broiler in which the meat may be turned without being withdrawn from the broiling compartment; and in which the position of the broiler with relation to the broiling flame may be readily adjusted as conditions may require.

A further object is to provide means for so supporting the broiling pan with relation to the broiling grid that grease which may be contained within the pan can not become ignited from the broiling flame.

The invention will be hereinafter fully set forth and particularly pointed out in the claims.

In the accompanying drawings:—Figure 1 is a perspective view illustrating the broiler oven part of a gas range, the broiling grid being shown partly tilted, the door of the oven being removed. Fig. 2 is a transverse sectional view of the broiler and its adjuncts, removed from the oven. Fig. 3 is a detail view of one of the elevator frame pieces. Fig. 4 is a vertical sectional view on line 4—4 Fig. 3. Fig. 5 is a top plan view illustrating the grid frame and the grid. Fig. 6 is a detail perspective view of the grid.

Referring to the drawing, 10 designates a broiler oven, the oven burners (not shown) for supplying the heat for cooking or broiling being located above and resting upon the burner support 11. It is obvious that while said burner support is illustrated as being in the rear of the oven, the same may be placed in any other suitable or desired position. The door of the oven (not shown) may be hinged on lugs such as those indicated at 12 and latched over on a lug 13.

Located in each end of the oven is a vertically disposed strip 20 provided with angular ends fastened to the end wall of the oven, the body of the said strip being spaced from said end wall, and constituting an elevator guide piece. The elevator frame pieces 21 (see Fig. 3) each comprise a transverse head A provided with a groove 22 extending longitudinally thereof and depending centrally from one edge of said head is a vertical guide member B provided with a guide groove 24 to receive one of the guide strips 20. The walls of the guide groove 24 are provided with inturned portions or lips 25 which embrace the guide strip 20 and normally prevent removal of the frame piece from said guide strip. Depending from the ends of member A and from the side opposite member B are the supporting arms of a member C, the latter being provided with a shoulder 26. The broiler pan 27 is supported on the shoulders 26 of members C.

The fixed distance vertically between the transverse groove 22 and the shoulder 26 has been established from experiment and when the elevator frame is raised or lowered the food being broiled is always maintained at a uniform distance from the broiler pan 27, thus avoiding the possibility of the gravy or juices, which fall into said broiler pan, from catching fire. The guide pieces 20 are provided with notches or reduced portions 28 which permit the lips 25 to be withdrawn from said guide pieces 20, thus providing a construction by which the elevator frame 21 may be placed in or removed from the oven without disassembling parts of the oven itself.

Extending into the space between members B and C and integral with member B is a projection 29 on which may be mounted a roller, if desired, said projection being provided with a small cam guide piece 30 preferably held in position by means of a screw 31. The elevator frame pieces are also provided with projecting tongues 32 which slide on the smooth rigid inner lining of the oven, and thus serve to maintain the elevator frames in proper relation. Mounted in the oven 10 is a rock shaft 33 supported in suitable bearings, preferably constructed so that the bearings as well as the rock shaft can be readily placed in or removed from the oven without disassembling parts of the oven itself. On each end of said rock shaft is secured a cam piece or arm 34 adapted to engage the underside of the lug or roller 29, the cam guide piece 30 serving to guide said arm in its movement. On one end of rock shaft 33 is cast or otherwise secured a suitable box or socket 35 adapted to receive one end of a lifting lever 36 provided with a suitable handle 37. The lever 36 is adapted to engage any one of a series of notches 38 arranged in a vertical bar 39, whereby the elevator frame may be held at any desired height so as to permit the food being broiled to be rigidly supported at any desired distance below the broiling burners.

The grid frame 23 is preferably rectangular and provided at the front with a notch 40 and at the rear with an opposite notch 41. On the rear of the frame is attached a piece 42 provided with a hole 43 in alinement with said notches. The frame is also provided at the front with angular shelf pieces 44, preferably placed on the inside of the front part of the frame. The grid is preferably formed of two members 45 and 45′ each provided with their lateral projections 46 which pass through the openings 47 in a frame piece 48, whereby independent and separate bearings are provided for the upper and lower sections 45 and 45′ respectively. The wires 49 of the lower member 45′ are preferably arranged at right angles to the corresponding wires of the upper member 45 although we do not desire to limit ourselves in this particular. The lower grid member 45′ is provided with a handle piece 50 adapted to rest in the notch 40, and the frame piece 48 is provided with a projecting pin or bearing piece 51 adapted to rest in the notch 41. The upper grid member is provided with a handle piece 52 adapted to coincide with the handle piece 50, and the two handle pieces may be united or locked together by means of a ring piece 53. The lower grid member is also provided with upturned end portions 54 which serve to prevent the meats from falling out when the grid is being reversed.

In practice when it is desired to employ the broiler, the ring piece 53 is drawn forward, whereupon the member 45 may be raised by handle 52. After the meat has been placed in position the upper and lower grid members are locked together by the ring piece 53, and the entire grid is pushed backward so that the pin 51 passes beyond the bearing or notch 41 and into the hole 43 of the piece 42. The grid will thus be pivotally supported on the pin 51 and the handle 50, the latter resting in notch 40, and then after drawing the grid slightly forward the same will be maintained in a horizontal position by the shelf pieces 44. To reverse the grid the same is moved by the handles 50 until the frame piece 48 engages the frame 23, whereupon the entire grid may be rotated and then drawn forward so that the member 45 will rest upon the shelf pieces 44. When it is desired to adjust the grid with respect to the burners the handle 37 is moved so as to disengage the lever 36 from the notches 38, whereupon the shaft 33 may be oscillated to adjust the frame pieces 21 to the desired height within the oven. It will be noted in this connection that the space between the grid frame 23 and the broiler pan 27 permits of the rotation of the grid as hereinbefore described.

The advantages of our invention are apparent from the foregoing. It will be particularly noted that by means of our improved broiler a positive and accurate adjustment of the meat with relation to the flame is maintained, and the food may be moved toward or away from the flame according as its nature and size may require. Further it will be noted that we have provided an improved reversible broiler arranged to be operated within the oven so as to broil equally on both sides, and yet not interrupt the broiling action.

It will be further observed that by means of our improved construction the rich juices of the meats may be conserved in a convenient and ever ready pan which may be removed from the oven independently of the food being broiled.

A further advantage lies in the means which permits the removal of the broiled meats without removing the entire broiling frame and grid, and which also prevents the spilling out of the meats while being broiled.

It will be further noted that our improved broiler is so constructed that the parts may be readily assembled or disassembled with respect to the oven without in any manner destroying or injuring the oven body.

Having thus explained the nature of our invention, and described an operative manner of constructing and using the same, although without attempting to set forth all of the forms in which it may be made, or all of the forms of its use, what we claim is:—

1. The combination with a broiler oven of a single guide strip secured to each end wall of the oven and spaced from said wall, frame pieces engaging said guide strips, and means for raising and lowering said frame pieces, said frame pieces being provided with spacing tongues engaging the end walls of said oven.

2. The combination with a broiler oven, of a single guide strip secured to each end wall of the oven and spaced from said wall, frame pieces each provided with a grooved guide member engaging one of said guide strips, the grooves of said guide members being provided with inturned lips embracing said guide strips, and means for raising and lowering said frame pieces.

3. The combination with a broiler oven, of a single guide strip secured to each end wall of the oven and spaced from said wall, frame pieces each provided with a grooved guide member engaging one of said guide strips, the grooves of said guide members being provided with inturned lips embracing said guide strips, means for raising and lowering said frame pieces, said guide strips being reduced in width at their upper ends to provide clearance for said lips, whereby the frame pieces may be disengaged from said guide strips.

4. The combination with a broiler oven of a single guide strip secured to each end wall of the oven and spaced from said wall, frame pieces each provided with a grooved guide member engaging one of said guide strips, the grooves of said guide members being provided with inturned lips embracing said guide strips, means for raising and lowering said frame pieces, said frame pieces being provided with spacing tongues engaging the end walls of said oven.

5. A broiler of the character described comprising frame pieces each formed with a horizontal grid supporting member provided with a longitudinal groove in one face and a vertical guide member also provided with a longitudinal groove in the other face, a grid frame having its ends supported in the grooves of said horizontal member, means for raising and lowering said frame pieces, and a horizontal guide arm engaging each guide groove.

6. A broiler of the character described comprising frame pieces each formed with a horizontal grid supporting member provided with a longitudinal groove in one face, and a vertical guide member also provided with a longitudinal groove in the other face, a grid frame having its ends supported in the grooves of said horizontal member, means for raising and lowering said frame pieces, and a single guide strip engaging each guide groove, said frame pieces being provided with spacing tongues engaging the end walls of said oven.

7. A broiler of the character described comprising frame pieces each formed with a horizontal grid supporting member provided with a longitudinal groove in one face and a vertical guide member also provided with a longitudinal groove in the other face, a grid frame having its ends supported in the grooves of said horizontal member, means for raising and lowering said frame pieces, and a single guide strip engaging each guide groove, the grooves of said vertical guide members being provided with inturned lips embracing said guide strips.

8. A broiler of the character described comprising frame pieces each formed with a horizontal grid supporting member and a depending member provided with shoulders adapted to support a drip pan, and means for raising and lowering the frame pieces.

9. The combination with a broiler oven of a single guide strip secured to each end wall of the oven and spaced from said wall, frame pieces engaging said guide strips, means for raising and lowering said frame pieces, said frame pieces being provided with spacing tongues engaging the end walls of said oven, said frame pieces being provided with depending members having shoulders adapted to support a drip pan.

10. A broiler of the character described comprising frame pieces each formed of a transverse member and two depending members, a grid frame secured between said transverse members, guides engaging one depending member of each frame piece, and means for raising and lowering said frame pieces, the second depending member of each frame piece being provided with a pan-supporting shoulder.

11. A broiler of the character described comprising frame pieces each formed of a transverse member, a pan-supporting member, and a central guide member, a grid frame carried by said transverse members, and means extending between the pan-supporting member and the guide member of each frame piece for raising and lowering said frame pieces.

12. The combination with a broiler oven, of a single guide strip secured to each end wall of the oven and spaced from said wall, frame pieces each formed of a transverse member, a pan-supporting member and a central guide member, a grid frame carried by said transverse members, and means extending between the pan supporting member and the guide member of each frame piece for raising and lowering the latter.

13. A broiler of the character described comprising frame pieces each formed of a transverse member, a pan-supporting member and a central guide member, a space being provided between the pan-supporting member and the guide member, said guide member being provided with a projection on one face extending into said space and a guide groove in its other face, means engaging said projection for raising and lowering the frame pieces, and guide strips engaging the grooves of said guide members.

14. The combination with a broiler oven, of a single guide strip secured to each end wall of said oven and spaced from said wall, frame pieces each formed of a transverse member, a pan supporting member and a central guide member, a space being provided between the back supporting member and the guide member, said guide member being provided with a projection on one face extending into said space and a guide groove in its other face, means engaging said projection for raising and lowering the frame pieces, and guide strips engaging the grooves of said guide members, said frame pieces being provided with spacing tongues engaging the end walls of said oven.

15. The combination with a broiler oven, of a single guide strip secured to each end wall of the oven and spaced from said wall, frame pieces engaging said guide strips, and means for raising and lowering said frame pieces, said frame pieces being provided with spacing tongues engaging the end walls of said oven, and a reversible grid carried by said frame pieces.

In testimony whereof we have hereunto set our hands in presence of two subscribing witnesses.

MARTIN W. LONGFELLOW.
HARRY W. HUNTER.

Witnesses:
ROBT. C. RHODES,
FRANK MOELLER.

Copies of this patent may be obtained for five cents each, by addressing the "Commissioner of Patents, Washington, D. C."